(12) United States Patent
Yokoyama

(10) Patent No.: US 11,198,205 B2
(45) Date of Patent: Dec. 14, 2021

(54) CUTTING TOOL AND MACHINING METHOD

(71) Applicant: JTEKT CORPORATION, Osaka (JP)

(72) Inventor: Takashi Yokoyama, Seto (JP)

(73) Assignee: JTEKT CORPORATION, Osaka (JP)

( * ) Notice: Subject to any disclaimer, the term of this patent is extended or adjusted under 35 U.S.C. 154(b) by 336 days.

(21) Appl. No.: 15/697,186

(22) Filed: Sep. 6, 2017

(65) Prior Publication Data

US 2018/0079047 A1  Mar. 22, 2018

(30) Foreign Application Priority Data

Sep. 16, 2016 (JP) .............................. JP2016-181362

(51) Int. Cl.
| | |
|---|---|
| B24B 5/04 | (2006.01) |
| B24D 99/00 | (2010.01) |
| B23B 1/00 | (2006.01) |
| B23B 27/16 | (2006.01) |
| B23B 5/36 | (2006.01) |

(52) U.S. Cl.
CPC ................ *B24B 5/045* (2013.01); *B23B 1/00* (2013.01); *B23B 27/16* (2013.01); *B24D 99/005* (2013.01); *B23B 5/36* (2013.01)

(58) Field of Classification Search
CPC ... B24B 5/045; B24B 29/043; B24B 2205/12; B23B 1/00; B23B 27/16; B23B 51/048; B23B 2251/50; B23B 29/043; B23B 2205/12; B23B 5/36; B23B 5/00; B23B 2270/54; B23B 29/04; B23B 29/046; B23B 29/12; B24D 99/005
USPC ......................................................... 451/49
See application file for complete search history.

(56) References Cited

U.S. PATENT DOCUMENTS

| | | | | | |
|---|---|---|---|---|---|
| 2,127,998 | A | * | 8/1938 | Jearum | B23B 27/164 407/109 |
| 2,230,953 | A | * | 2/1941 | Indge | B24B 5/045 451/271 |
| 3,027,786 | A | * | 4/1962 | Severson | B23B 29/03407 408/197 |
| 4,124,328 | A | * | 11/1978 | Hopkins | B23B 27/141 408/199 |
| 4,334,446 | A | * | 6/1982 | Field | B23B 29/043 407/40 |

(Continued)

FOREIGN PATENT DOCUMENTS

| | | |
|---|---|---|
| JP | H05-026204 U | 4/1993 |
| JP | 2009-255189 A | 11/2009 |
| WO | 2013/0179850 A1 | 12/2013 |

OTHER PUBLICATIONS

Aug. 4, 2020 Office Action issued in Japanese Patent Application No. 2016-181362.

*Primary Examiner* — Eileen P Morgan
*Assistant Examiner* — Marcel T Dion
(74) *Attorney, Agent, or Firm* — Oliff PLC

(57) ABSTRACT

A cutting tool includes: a cutting part including a cutting edge having a linear shape; and a fitted part including a fixed section to which the cutting part is fixed, and a fitted part body to be fitted to a cutting device. The cutting edge is located perpendicularly to a virtual line passing through a central axis of the fitted part body, on a plane that is perpendicular to the central axis of the fitted part body. A center of the cutting edge in its longitudinal direction is located on the virtual line.

5 Claims, 9 Drawing Sheets

(56) References Cited

U.S. PATENT DOCUMENTS

| | | | | |
|---|---|---|---|---|
| 4,367,991 A * | 1/1983 | Grafe | B23B 27/141 | 408/186 |
| 4,636,117 A * | 1/1987 | Shikata | B23B 27/1622 | 407/104 |
| 4,898,054 A * | 2/1990 | Bystrom | B23B 29/043 | 407/102 |
| 6,865,789 B2 * | 3/2005 | Katoh | B23B 29/242 | 29/39 |
| 7,216,571 B2 * | 5/2007 | Schreiber | B23D 37/005 | 82/1.11 |
| 7,371,032 B2 * | 5/2008 | Jansson | B23B 27/007 | 407/11 |
| 10,921,770 B2 * | 2/2021 | Kanada | B23B 1/00 | |
| 2004/0161309 A1 * | 8/2004 | Thiele | B23B 29/043 | 407/33 |
| 2005/0135884 A1 * | 6/2005 | Lundvall | B23B 27/145 | 407/113 |
| 2005/0160887 A1 * | 7/2005 | Erickson | B23B 1/00 | 82/121 |
| 2008/0089750 A1 * | 4/2008 | Chang | B23C 5/2208 | 407/103 |
| 2009/0220312 A1 * | 9/2009 | Shamoto | B23B 29/04 | 407/114 |
| 2010/0067992 A1 * | 3/2010 | Uchijo | B23B 27/007 | 407/100 |
| 2011/0243674 A1 * | 10/2011 | Kitagawa | B23B 27/007 | 408/199 |
| 2012/0087750 A1 * | 4/2012 | Kobayashi | B23B 27/007 | 407/77 |
| 2012/0328379 A1 * | 12/2012 | Nagaya | B23B 27/04 | 407/66 |
| 2013/0279997 A1 * | 10/2013 | Hecht | B23B 27/045 | 407/105 |
| 2013/0287506 A1 * | 10/2013 | Morgulis | B23B 27/065 | 407/103 |
| 2014/0377019 A1 * | 12/2014 | Kobayashi | B23B 27/007 | 407/11 |
| 2016/0368060 A1 * | 12/2016 | Ishihara | B23B 1/00 | |
| 2017/0129018 A1 * | 5/2017 | Ishihara | B23B 29/323 | |
| 2018/0071827 A1 * | 3/2018 | Koide | B23B 5/00 | |
| 2018/0257145 A1 * | 9/2018 | Kanada | G05B 19/4093 | |

* cited by examiner

CUTTING TOOL AND MACHINING METHOD

INCORPORATION BY REFERENCE

The disclosure of Japanese Patent Application No. 2016-181362 filed on Sep. 16, 2016 including the specification, drawings and abstract, is incorporated herein by reference in its entirety.

BACKGROUND OF THE INVENTION

1. Field of the Invention

The invention relates to a cutting tool that includes a cutting part having a linear cutting edge, and relates also to a machining method performed with the use of the cutting tool.

2. Description of the Related Art

In recent years, due to improvement in performance of cutting tools, such as cubic boron nitride (CBN) tools, grinding for surface finish has been increasingly replaced with hard turning and hard skiving through which a hardened workpiece is cut with a high degree of accuracy. For example, WO 2013/179850 describes a skiving device in which one end of a cylindrical workpiece in its axial direction is held on a main spindle of a lathe, and a cutting tool having a linear cutting edge, which is tilted with respect to the axial direction of the workpiece, is fitted to a turret of the lathe. The skiving device cuts an outer peripheral surface of the workpiece by bringing the cutting edge of the cutting tool into contact with the outer peripheral surface, in the range of the length of the cutting edge.

FIGS. 10A to 10D illustrate an example of a cutting tool to be fitted to a lathe for the purpose of hard skiving. As illustrated in FIGS. 10A to 10C, a cutting tool 120 includes a tip 122 (cutting part) having a cutting edge 122a, and a shank 121 (fitted part) to which the tip 122 is fixed. As illustrated in FIG. 10D, the tip 122 has a generally equilateral-triangular shape, and has the cutting edge 122a at one side of the equilateral-triangular shape. The shank 121 includes a shank body 123 (see FIGS. 10A and 10B) and a fixed section 124 (see FIGS. 10A and 10C). The shank body 123 is in the form of a rectangular shaft having a square cross-section, and is fitted to a turret. The fixed section 124 is provided at one end of the shank body 123 in the axial direction, and the tip 122 is fixed to the fixed section 124. The fixed section 124 has a substantially rectangular parallelepiped shape of which the width is substantially equal to that of the shank body 123 and of which the length in the up-down direction is larger than that of the shank body 123. The fixed section 124 is integral with the shank body 123. One corner of an upper end of the fixed section 124 is chamfered to form a fixed surface 124a, and the tip 122 is fixed to the fixed surface 124a.

As illustrated in FIG. 10C, the tip 122 fitted to the fixed surface 124a of the shank 121 is tilted at a prescribed deflection angle θ with respect to a coordinate axis X passing through a central axis C2 of the shank body 123. As illustrated in FIG. 10D, the one side of the tip 122, at which the cutting edge 122a is provided, is rounded at respective ends, and a linear portion of the one side serves as the cutting edge 122a that is actually used for cutting. In FIG. 10D, the positions of the respective ends of the cutting edge 122a are denoted by reference signs Pa, Pb.

In a cutting device, such as a numerically-controlled (NC) lathe that performs cutting of a workpiece through numerical control, it is necessary to acquire the position of a tip in advance in order to control the operation of a cutting tool. When the tip 122 having the cutting edge 122a with a linear shape is used, the position (coordinates) of the end point Pa of the cutting edge 122a is measured with the use of a measuring instrument, such as a tool presetter. However, the end point Pa of the cutting edge 122a constitutes a border between the rounded portion and the linear portion in the one side of the tip 122. For this reason, the position of the end point Pa cannot be determined with the use of a measuring instrument, and thus the end point Pa cannot be directly measured. In related art, therefore, an apex at a corner of the tip 122 closest to the end point Pa is used as a reference point Pc, and information (e.g., distance) about the position of the end point Pa relative to the reference point Pc is acquired, as a parameter, in advance. After the reference point Pc is measured with the use of a measuring instrument, the position of the end point Pa is obtained from a measured value of the reference point Pc, through calculation based on the information about the relative position.

However, the reference point PC is a virtual point that does not actually exist. Therefore, it is difficult to measure the reference point Pc, so that it is extremely difficult to accurately obtain the end point Pa on the basis of the reference point Pc.

SUMMARY OF THE INVENTION

One object of the invention is to provide a cutting tool and a machining method that make it possible to easily obtain a prescribed position of a cutting edge of a cutting part.

An aspect of the invention relates to a cutting tool including: a cutting part including a cutting edge having a linear shape; and a fitted part including a fixed section to which the cutting part is fixed, and a fitted part body to be fitted to a cutting device. The cutting edge is located perpendicularly to a virtual line passing through a central axis of the fitted part body, on a plane that is perpendicular to the central axis of the fitted part body. A center of the cutting edge in a longitudinal direction of the cutting edge is located on the virtual line.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
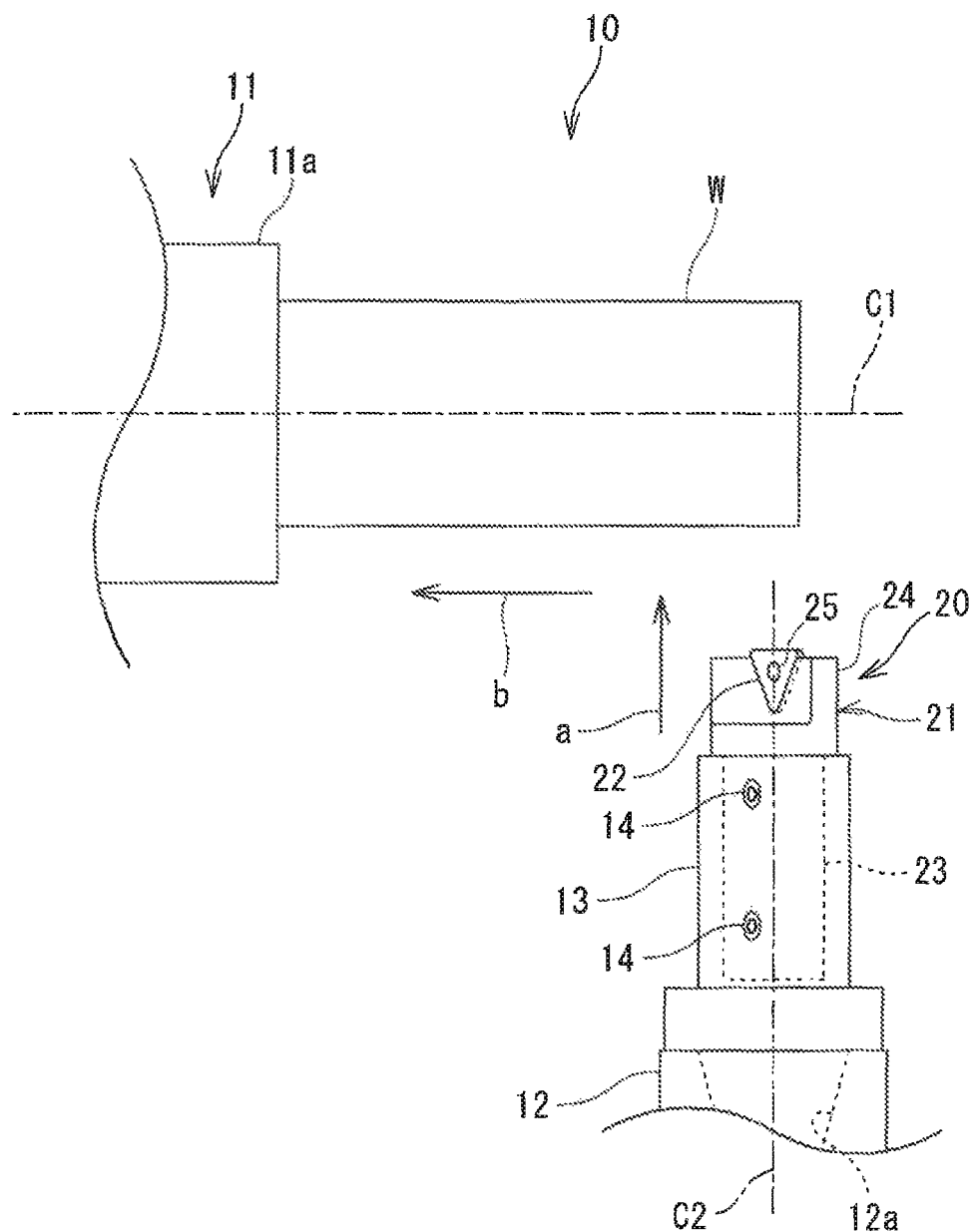
FIG. 1 is a view illustrating a cutting device equipped with a cutting tool according to a first embodiment.

Hereinafter, example embodiments of the invention will be described with reference to the accompanying drawings. FIG. 1 is a view illustrating a cutting device 10 equipped with a cutting tool 20 according to a first embodiment. The cutting device 10 is, for example, a machining center. The cutting device 10 is equipped with the cutting tool 20, and thus the cutting device 10 functions as a lathe that performs hard skiving. The cutting device 10 includes a tool rotating shaft 12 and a main spindle 11. A tool holder 13 equipped with the cutting tool 20 is detachably fitted to the tool rotating shaft 12. The main spindle 11 has a chuck 11a to which a workpiece W is detachably fitted.

The workpiece W in the present embodiment has a columnar shape. The workpiece W is fitted to the main spindle 11 such that a central axis of the workpiece W coincides with a central axis C1 of the main spindle 11. Therefore, the central axis of the workpiece W will be denoted by the same reference sign (C1) as that of the central axis of the main spindle 11, in the following description. The workpiece W is driven by the main spindle 11, so as to be rotated about the central axis C1.

The tool holder 13 is fitted to a distal end of the tool rotating shaft 12, and the tool rotating shaft 12 is driven to be rotated about a central axis C2. A fitting hole 12a in which the tool holder 13 is fitted is provided in a distal end portion of the tool rotating shaft 12. The cutting device 10 is configured such that the cutting tool 20 is brought into contact with the workpiece W by moving the tool rotating shaft 12 in a direction of an arrow a, and an outer peripheral surface of the workpiece W is cut by moving the tool rotating shaft 12 in a direction of an arrow b. The cutting device 10 has a function (indexing function) of controlling the amount of rotation (rotation angle) of the tool rotating shaft 12 through numerical control.

Figure 2:
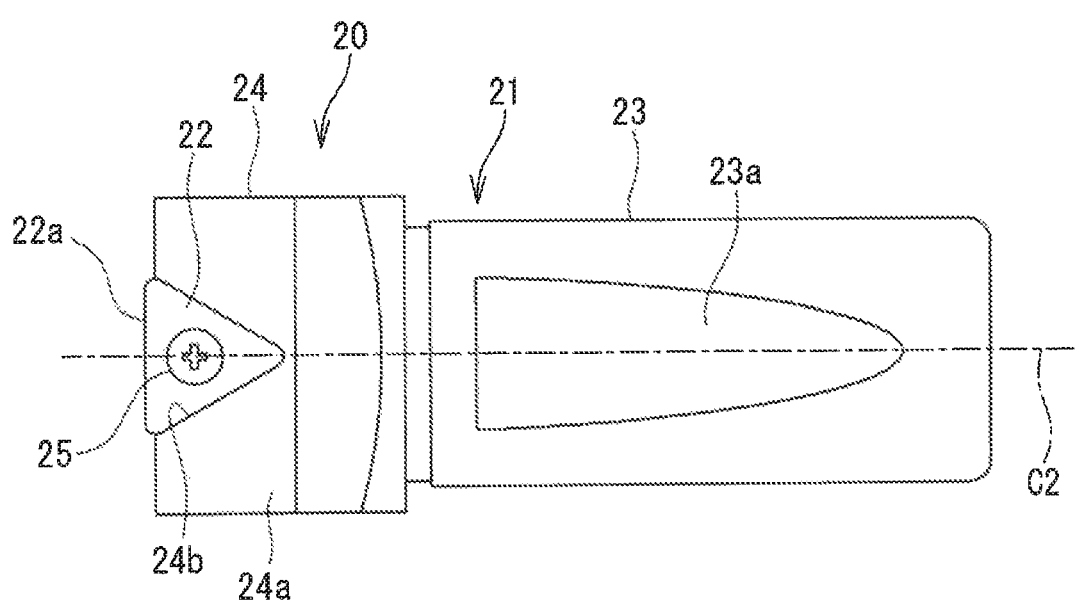
FIG. 2 is a plan view of the cutting tool.
Figure 3:
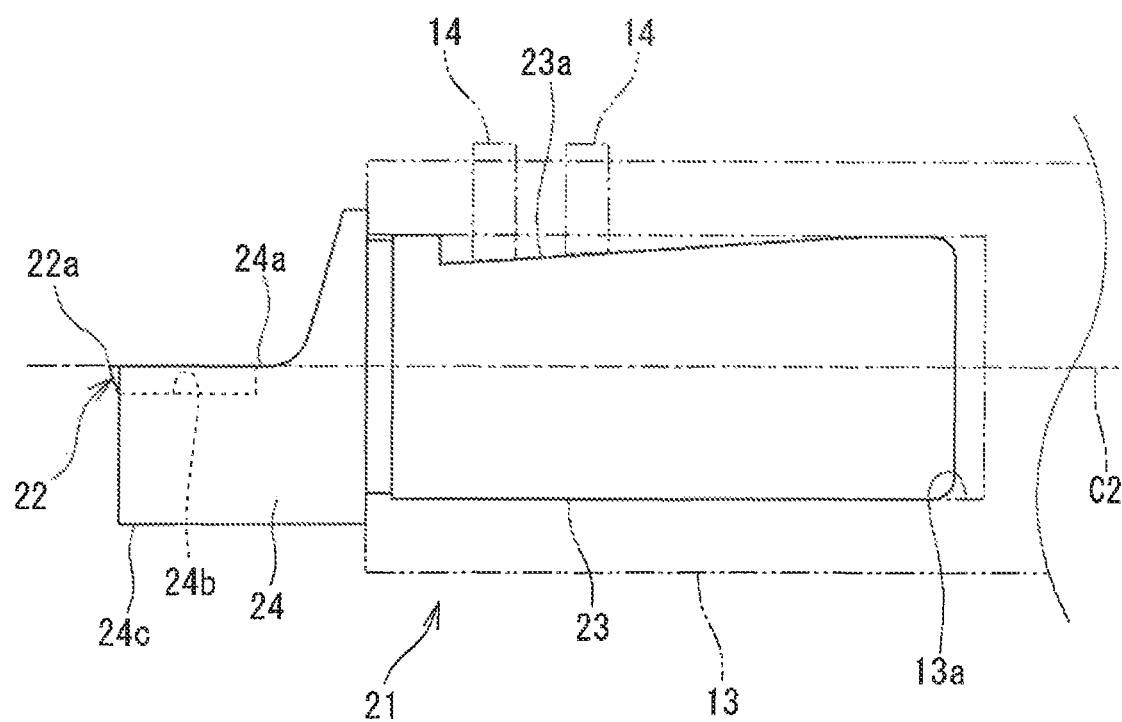
FIG. 3 is a side view of the cutting tool.
Figure 4:
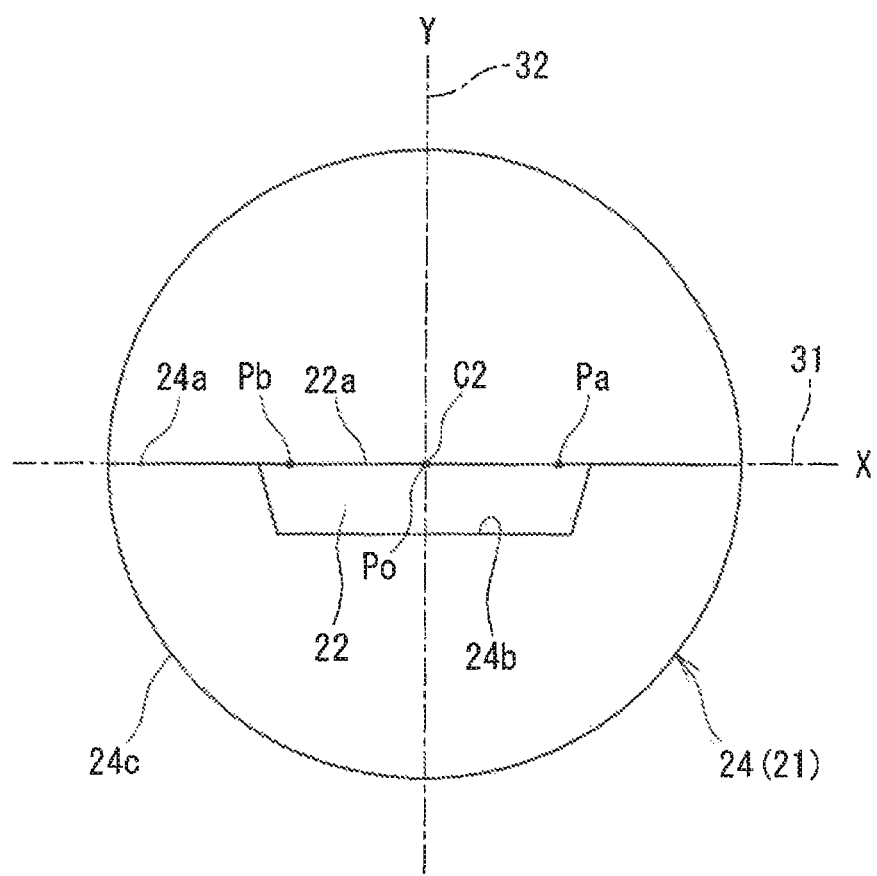
FIG. 4 is a front view of the cutting tool.

FIG. 2 is a plan view of the cutting tool 20. FIG. 3 is a side view of the cutting tool 20. FIG. 4 is a front view of the cutting tool 20. The cutting tool 20 includes a shank 21 (an example of "fitted part") and a tip 22 (an example of "cutting part"). The shank 21 has a shank body 23 (an example of "fitted part body") that is fitted to the tool holder 13. The tool holder 13 is a component used to fit the cutting tool to the machining center, and a commercially available tool holder may be used as the tool holder 13.

The shank body 23 is in the form of a columnar round shaft. The shank body 23 is detachably fitted in a fitting hole 13a provided in the tool holder 13. The shank 21 includes a fixed section 24 provided at a distal end portion of the shank body 23 in an integrated manner. The fixed section 24 is a section to which the tip 22 is fixed. The fixed section 24 has a generally semi-columnar shape.

A central axis of the shank body 23 and a central axis of the fixed section 24 coincide with each other. The fixed section 24 is larger in diameter than the shank body 23. The shank 21 of the cutting tool 20 is provided along with the tool holder 13 so as to be concentric with the tool rotating shaft 12. Therefore, the central axes of the shank 21 and the tool holder 13 will be denoted by the same reference sign (C2) as that of the central axis of the tool rotating shaft 12, in the following description.

A flat surface 23a is provided in a part of an outer peripheral surface of the shank body 23. The flat surface 23a is slanted with respect to the central axis C2 such that the distance between the flat surface 23a and the central axis C2 is reduced in a direction toward the fixed section 24. Distal ends of fixing bolts 14 screwed in a side surface of the tool holder 13 are brought into contact with the flat surface 23a. The shank 21 is fixed to the tool holder 13 with the fixing bolts 14. More specifically, the shank 21 is prevented from falling out of the tool holder 13, and is prevented from rotating relative to the tool holder 13 about the central axis C2.

The fixed section 24 is formed in a generally semi-columnar shape by cutting off a large part of a distal end portion of a columnar body. An outer peripheral surface of the fixed section 24 includes a semi-cylindrical surface 24c and a fitting surface 24a that is a flat surface extending along the central axis C2. A recess 24b in which the tip 22 is housed is provided in the fitting surface 24a of the fixed section 24. The recess 24b has substantially the same shape as that of a planar shape of the tip 22.

Figure 5:
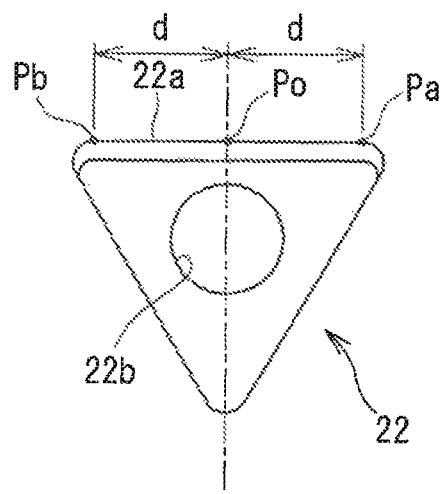
FIG. 5 is a plan view of a tip.

FIG. 5 is a plan view of the tip 22. The tip 22 has a triangular shape in a plan view. The tip 22 is formed of, for example, a sintered body containing cubic boron nitride (CBN). One side of the tip 22 serves as a cutting edge 22a for cutting the workpiece W. The tip 22 is housed in the recess 24b of the fixed section 24, with the cutting edge 22a slightly protruding from a distal end surface of the fixed section 24. A through-hole 22b is provided at a substantially central part of the tip 22 in a plan view. The tip 22 is fixed by screwing a fixing bolt 25 (see FIG. 2), which has been inserted into the through-hole 22b, to the fixed section 24.

Each corner of the tip 22 is rounded. The cutting edge 22a is formed of a linear portion of one side of the tip 22. Both ends of the cutting edge 22a (end points Pa, Pb) constitute border points between the cutting edge 22a and the rounded portions. The end point Pa serves as a machining start point Pa' that comes into contact with the workpiece W at the start of machining. The end point Pb serves as a machining end point Pb' that comes into contact with the workpiece W at the end of machining (see FIG. 6).

As illustrated in FIG. 4, a first virtual line 31 and a second virtual line 32 that perpendicularly cross each other at the central axis C2 are set on a plane perpendicular to the central axis C2 of the shank 21. In this case, the cutting edge 22a of the tip 22 fixed to the fixed section 24 is located on the first virtual line 31 and is perpendicular to the second virtual line 32. A center Po of the cutting edge 22a in its longitudinal direction is located on the second virtual line 32. More specifically, the center Po of the cutting edge 22a in its longitudinal direction is located on the central axis C2 of the shank 21. As will be described later, the first virtual line 31 and the second virtual line 32 are used to set a reference posture of the cutting edge 22a in an orthogonal coordinate system for obtaining the position of the machining start point Pa' of the cutting edge 22a.

Figure 6:
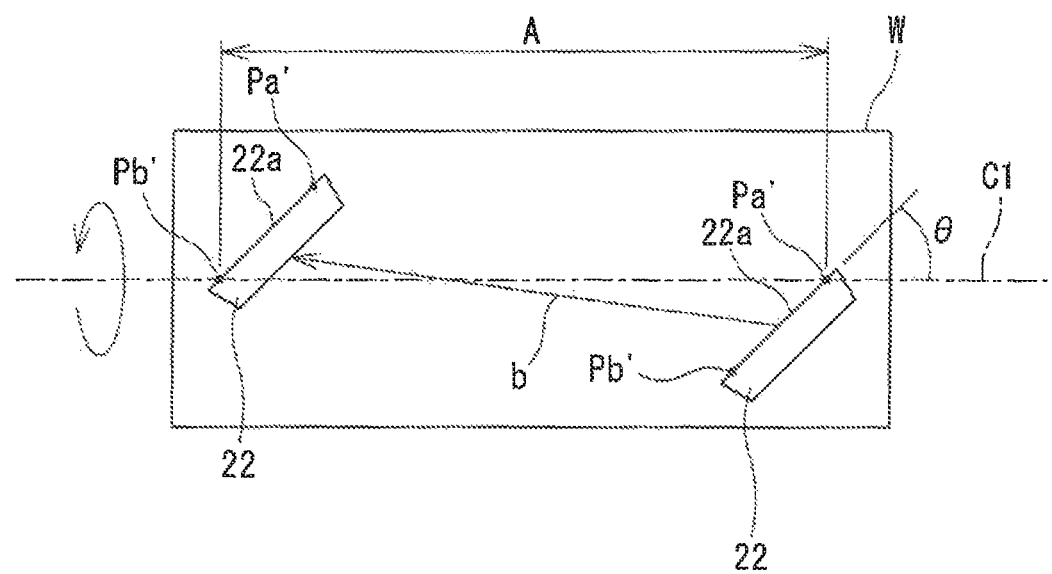
FIG. 6 is a view illustrating how a workpiece is cut.

FIG. 6 is a view illustrating how the workpiece W is cut. When cutting of the workpiece W is performed, the tip 22 of the cutting tool 20 is disposed so as to be tilted at a prescribed deflection angle $\theta$ with respect to the central axis C1 of the workpiece W. In the cutting device 10, the machining start point Pa', which is one end of the cutting edge 22a, is brought into contact with the outer peripheral surface of the workpiece W located on a lateral side of the central axis C1. Then, the tip 22 is moved in the direction of the arrow b to move the point of contact with the workpiece W over the cutting edge 22a. When the point of contact between the tip 22 and the workpiece W reaches the machining end point Pb', which is the other end of the cutting edge 22a, the cutting edge 22a is separated from the workpiece W.

Due to the operation of the tip 22, the outer peripheral surface of the workpiece W is cut in a prescribed machining area A. Cutting of the workpiece W in the machining area A is performed using the entire length of the cutting edge 22a. Thus, wear and damage of the cutting edge 22a are suppressed, so that the service life of the tip 22 can be prolonged. A tip commonly used for cutting work is configured such that cutting is performed at one corner portion of its polygonal shape. As a result, a fine spiral groove is left in an outer peripheral surface of a workpiece. In contrast to this, in the present embodiment, cutting is performed by the cutting edge 22a having a linear shape, so that formation of such a groove can be suppressed In order to perform the cutting process through numerical control, it is necessary for the cutting device 10 to acquire the position (posture) of the tip 22 in advance. Therefore, before the cutting process, a step of acquiring the position of the tip 22 is performed in the cutting device 10. The cutting device 10 according to the present embodiment is configured to acquire the position of the tip 22 by obtaining the coordinates of the machining start point Pa' of the tip 22.

Figure 7:
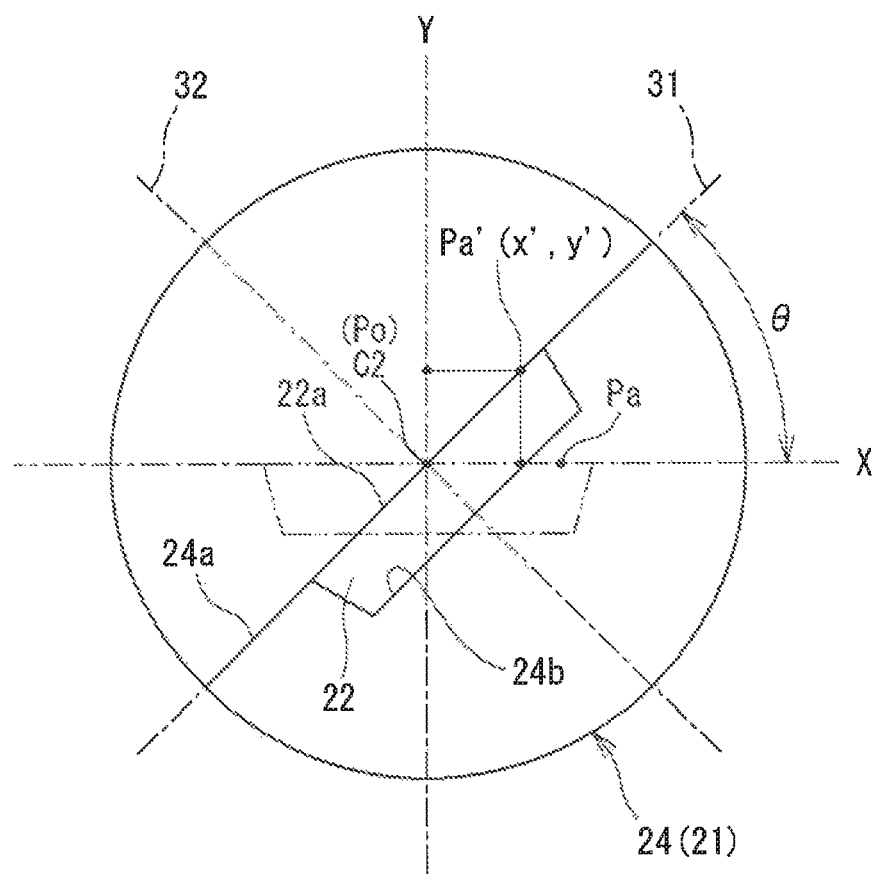
FIG. 7 is a front view illustrating a method of measuring a machining start point of the cutting tool.

FIG. 7 is a view illustrating a method of acquiring the machining start point Pa' of the cutting tool 20. As described above, the cutting tool 20 is configured such that the center Po of the cutting edge 22a in its longitudinal direction and the central axis C2 of the shank 21 coincide with each other. In the cutting device 10 according to the present embodiment, an orthogonal coordinate system having its origin on the central axis C2 of the shank 21 is set, and the coordinates of the machining start point Pa' in the orthogonal coordinate system are obtained. Specifically, an X-axis extending horizontally and passing through the central axis C2 and a Y-axis perpendicular to the X-axis and the central axis C2 are set.

A reference posture (deflection angle θ=0°) of the tip 22 of the cutting tool 20 is set to the posture of the tip 22 when the first virtual line 31 coincides with the X-axis and the second virtual line 32 coincides with the Y-axis as illustrated in FIG. 4. Then, a cutting posture of the tip 22 of the cutting tool 20 is set to the posture of the tip 22 when the tip 22 is tilted at the prescribed deflection angle θ with respect to the X-axis. The cutting posture of the tip 22 is achieved by rotating the tool rotating shaft 12 from the reference posture.

The deflection angle θ of the tip 22 is a control value that is acquired from the amount of rotation of the tool rotating shaft 12. A distance d (see FIG. 5) from the center Po of the cutting edge 22a in its longitudinal direction to the machining start point Pa' is a design value of the cutting tool 20, and is therefore a known value. Thus, the coordinates (x', y') of the machining start point Pa' in an XY-coordinate system can be obtained by Equations (1), (2).

$$x' = d \cos \theta \quad \text{Equation (1)}$$

$$y' = d \sin \theta \quad \text{Equation (2)}$$

In the cutting device 10, the distance d from the center Po of the cutting edge 22a in its longitudinal direction to the machining start point Pa' is stored, as a parameter, in advance in a controller, and then the coordinates of the machining start point Pa' are obtained based on the amount of rotation of the tool rotating shaft 12 and the distance d. Thus, unlike in related art, it is no longer necessary to externally measure the position of a tip of a cutting tool provided in a cutting device by using a measuring instrument, such as a tool presetter. As a result, it is possible to more accurately acquire the position of the tip.

The cutting tool 20 according to the present embodiment includes the shank body 23 in the form of a round shaft. Thus, the cutting tool 20 can be appropriately fitted to the tool rotating shaft 12 of the machining center using the tool holder 13.

Figure 8:
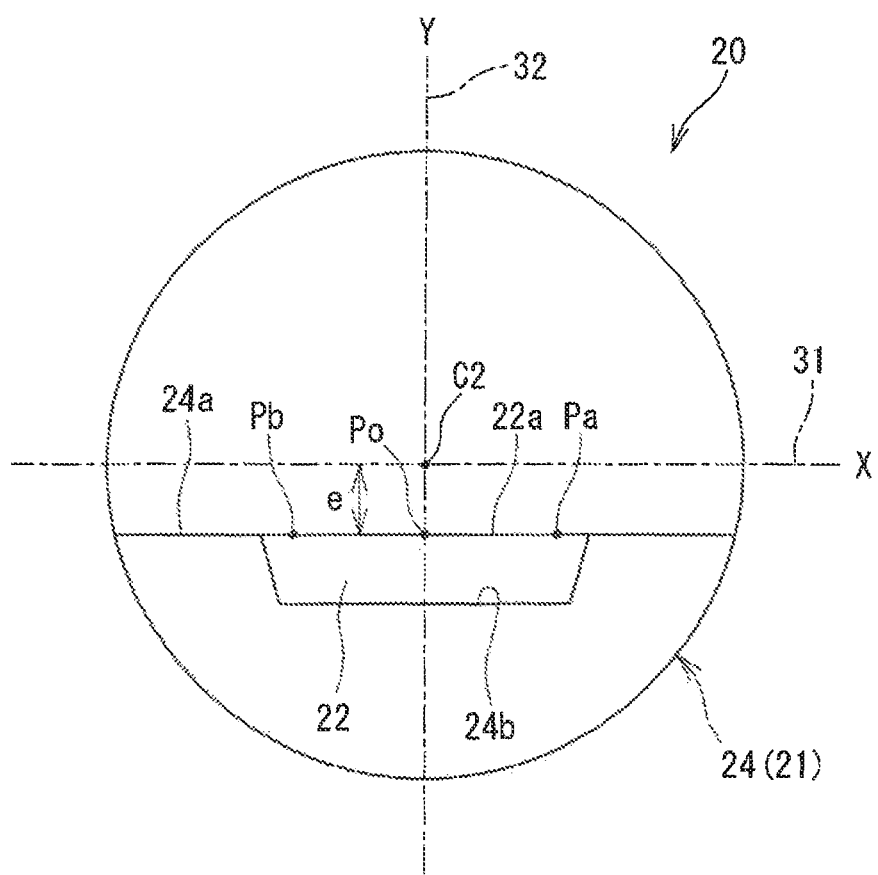
FIG. 8 is a front view of a cutting tool according to a second embodiment.

FIG. 8 is a front view of a cutting tool 20 according to a second embodiment. As in the first embodiment, the cutting edge 22a of the tip 22 of the cutting tool 20 according to the present embodiment is located so as to be perpendicular to the second virtual line 32 that is perpendicular to the central axis C2 of the shank body 23. The center Po of the cutting edge 22a in its longitudinal direction is located on the second virtual line 32. However, the cutting edge 22a is not located on the first virtual line 31, and the center Po of the cutting edge 22a is not located on the central axis C2. The cutting edge 22a is located parallel to the first virtual line 31, at a position apart from the first virtual line 31 by a distance e.

Figure 9:
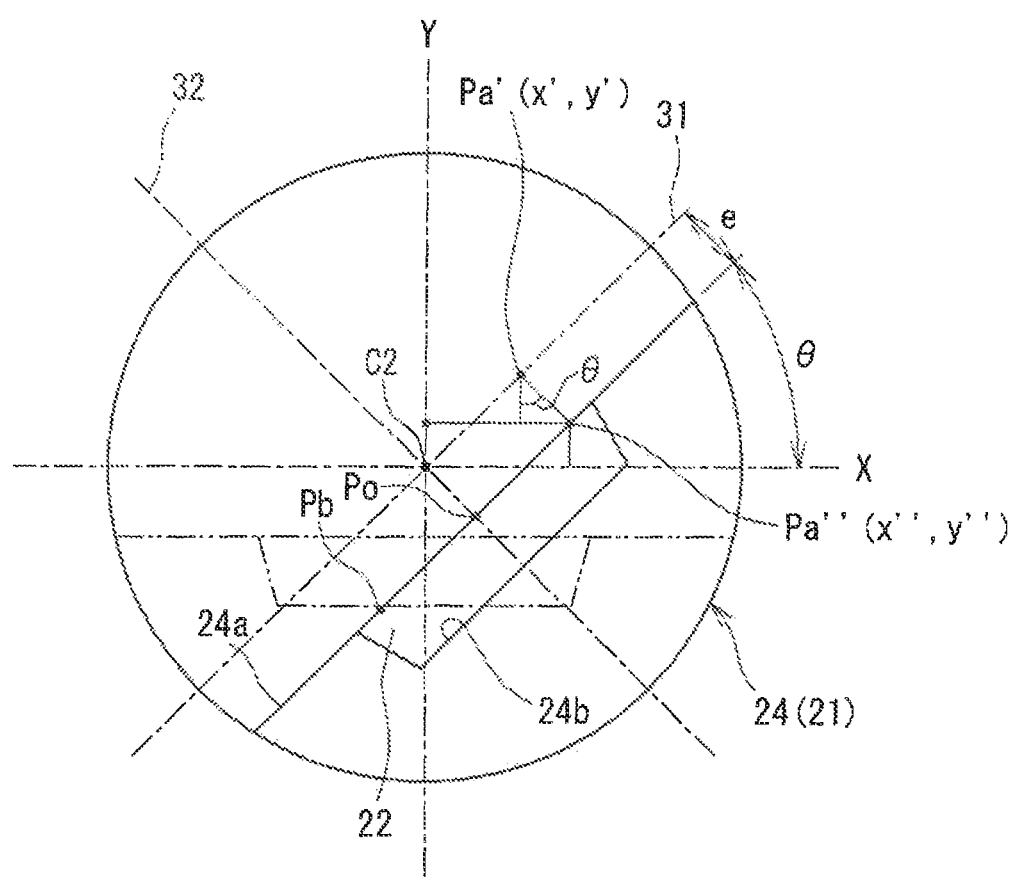
FIG. 9 is a front view illustrating a method of measuring a machining start point of the cutting tool.
Figure 10B:
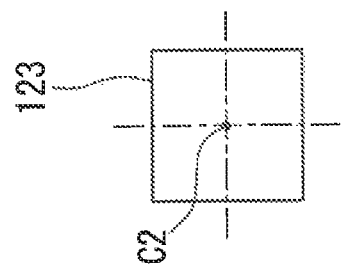
FIG. 10B is a rear view of the cutting tool in the related art.
Figure 10D:
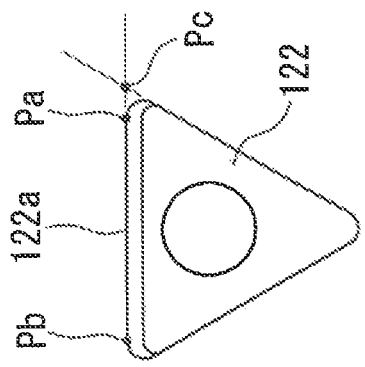
FIG. 10D is a plan view of a tip of the cutting tool in the related art.
Figure 10A:
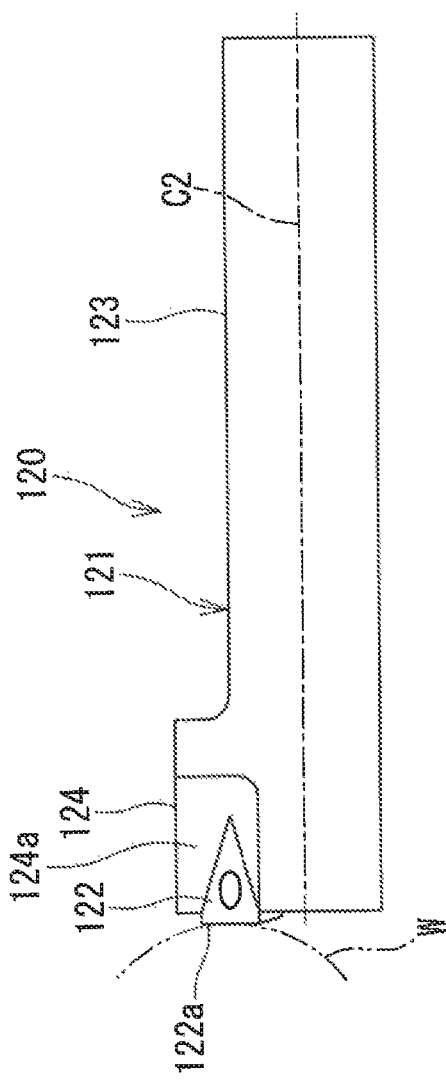
FIG. 10A is a side view of a cutting tool in related art.
Figure 10C:
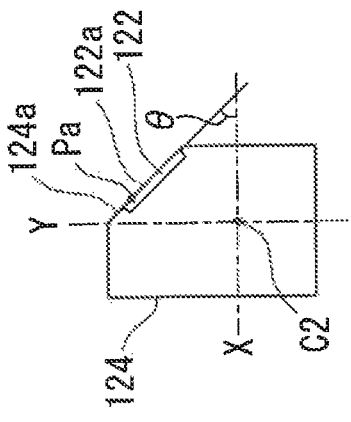
FIG. 10C is a front view of the cutting tool in the related art.

FIG. 9 is a view illustrating a method of acquiring a machining start point Pa" of the cutting tool 20. A cutting posture of the tip 22 of the cutting tool 20 is set to the posture of the tip 22 when the tip 22 is tilted at a prescribed deflection angle θ with respect to the X-axis. The cutting posture of the tip 22 is achieved by rotating the tool rotating shaft 12. As in the first embodiment, the deflection angle θ of the tip 22 is a control value acquired from the amount of rotation of the tool rotating shaft 12. The distance d from the center Po of the cutting edge 22a in its longitudinal direction to the machining start point Pa" and the distance e from the center Po to the central axis C2 are design values of the cutting tool 20, and are therefore known values. The coordinates (x", y") of the machining start point Pa" in the XY-coordinate system can be obtained by calculation based on these known values.

In an example illustrated in FIG. 9, the coordinates (x', y') of the machining start point Pa' in a case where the center Po of the cutting edge 22a is located on the central axis C2 are obtained by Equations (1), (2), according to the same method as that in the first embodiment. Then, the coordinates Pa" (x", y") apart from the point Pa' by the distance e can be obtained by Equations (3), (4).

$$x'' = x' + e \sin \theta \quad \text{Equation (3)}$$

$$y'' = y' - e \cos \theta \quad \text{Equation (4)}$$

In the cutting device 10, the distance d from the center Po of the cutting edge 22a in its longitudinal direction to the machining start point Pa" and the distance e from the center Po to the central axis C2 are stored, as parameters, in advance in the controller, and the coordinates of the machining start point Pa" are obtained based on the amount of rotation of the tool rotating shaft 12 and the distances d, e. However, the method of calculating the coordinates of the machining start point Pa" is not limited to the method using Equations (1) to (4), and these coordinates may be obtained by other calculation methods using the foregoing known values.

The invention is not limited to the foregoing embodiments, and the foregoing embodiments may be modified within the technical scope of the appended claims. For example, the prescribed position of the cutting edge obtained through calculation is not limited to the machining start point, and may be a machining end point or other positions.

The cutting tool is not limited to a cutting tool in which the tip is detachably fitted to the shank. The cutting tool may be a cutting tool in which a tip is integral with a shank. The tip may be any tip that has a linear cutting edge, and is not limited to a tip having a triangular shape in a plan view. The material of the tip is not limited to any particular material. However, it is preferable to use a tip having, for example, a hardness required for hard skiving.

The cutting tool may be a cutting tool in which a shank body of a shank is in the form of a polygonal shaft (polygonal column). In this case, a cutting edge of a tip needs to have a prescribed relationship with the central axis of the rectangular shaft. The cutting device is not limited to a machining center, and may be, for example, a numerically-controlled (NC) lathe.

According to the invention, it is possible to easily obtain a prescribed position of a cutting edge of a cutting part of a cutting tool.

What is claimed is:

1. A machining method of machining a surface of a cylindrical workpiece by using a cutting tool, the cutting tool being fitted to a tool rotating shaft of a cutting device, the cutting tool comprising (i) cutting part including a linear cutting edge and (ii) a fitted part including (a) a fixed section to which the cutting part is fixed, and (b) a fitted part body fitted to the cutting device, wherein the linear cutting edge is located perpendicularly to a virtual line passing through a central axis of the fitted part body, on a plane that is perpendicular to the central axis of the fitted part body, the virtual line being perpendicular to the central axis of the fitted part body, and a center of the linear cutting edge in a longitudinal direction of the linear cutting edge is located on the virtual line, the machining method comprising:

obtaining a distance d from the center of the linear cutting edge to a machining start point of the linear cutting edge;

setting a deflection angle θ of the linear cutting edge by rotating the tool rotating shaft by a predetermined amount;

calculating a position, within an orthogonal coordinate system having its origin on a central axis of the fitted part, of the machining start point based on the distance d and the deflection angle θ, wherein the position, represented by (x', y'), is calculated by the following equations:

$x'=d \cos \theta$ $y'=d \sin \theta$; and machining the surface of the cylindrical workpiece by (i) moving the machining start point within the orthogonal coordinate system from the obtained position to a point at which the machining start point contacts the surface of the cylindrical workpiece during rotation of the cylindrical workpiece about a longitudinal axis of the cylindrical workpiece, and (ii) moving the cutting part along a path that is not parallel to the longitudinal axis of the cylindrical workpiece, thereby causing a point of contact between the cutting part and the cylindrical workpiece to move along the linear cutting edge until the point of contact reaches a machining end point of the linear cutting edge.

2. The method according to claim 1, wherein the center of the linear cutting edge in the longitudinal direction is located on the central axis of the fitted part body.

3. The method according to claim 1, wherein the fitted part body is in a form of a round shaft.

4. A machining method of machining a surface of a cylindrical workpiece by using a cutting tool, the cutting tool being fitted to a tool rotating shaft of a cutting device, the cutting tool comprising (i) a cutting part including a linear cutting edge and (ii) a fitted part including (a) a fixed section to which the cutting part is fixed, and (b) a fitted part body fitted to the cutting device, wherein the linear cutting edge is located perpendicularly to a virtual line passing through a central axis of the fitted part body, on a plane that is perpendicular to the central axis of the fitted part body, the virtual line being perpendicular to the central axis of the fitted part body, and a center of the linear cutting edge in a longitudinal direction of the linear cutting edge is located on the virtual line, the machining method comprising:

obtaining a distance d from the center of the linear cutting edge to a machining start point of the linear cutting edge;

setting a deflection angle θ of the linear cutting edge by rotating the tool rotating shaft by a predetermined amount;

calculating a position, within an orthogonal coordinate system having its origin on a central axis of the fitted part, of the machining start point based on the distance d and the deflection angle θ, wherein the center of the linear cutting edge is spaced from the central axis of the fitted part body by a distance e, and the position, represented by (x'', y''), is calculated by the following equations:

$x'=d \cos \theta$ $y'=d \sin \theta$ $x''=x'+e \sin \theta$ $y''=y'-e \cos \theta$; and machining the surface of the cylindrical workpiece by (i) moving the machining start point within the orthogonal coordinate system from the obtained position to a point at which the machining start point contacts the surface of the cylindrical workpiece during rotation of the cylindrical workpiece about a longitudinal axis of the cylindrical workpiece, and (ii) moving the cutting part along a path that is not parallel to the longitudinal axis of the cylindrical workpiece, thereby causing a point of contact between the cutting part and the cylindrical workpiece to move along the linear cutting edge until the point of contact reaches a machining end point of the linear cutting edge.

5. The method according to claim 4, wherein the fitted part body is in a form of a round shaft.

* * * * *